United States Patent

Miyaoh et al.

Patent Number: 5,203,576
Date of Patent: Apr. 20, 1993

[54] CLIP FOR A GASKET

[75] Inventors: Yoshio Miyaoh; Yoshio Yamada; Susumu Inamura, all of Tokyo, Japan

[73] Assignee: Ishikawa Gasket Co., Ltd., Tokyo, Japan

[21] Appl. No.: 801,348

[22] Filed: Dec. 2, 1991

Related U.S. Application Data

[63] Continuation-in-part of Ser. No. 775,529, Oct. 15, 1991.

[30] Foreign Application Priority Data

Dec. 13, 1990 [JP] Japan .............................. 2-400547[U]

[51] Int. Cl.$^5$ .............................................. F16J 15/10
[52] U.S. Cl. .................................. 277/235 B; 277/9.5; 277/189
[58] Field of Search ................... 277/9.5, 11, 181, 189, 277/235 B

[56] References Cited

U.S. PATENT DOCUMENTS

| | | | |
|---|---|---|---|
| 922,132 | 5/1909 | Gold | 277/181 |
| 1,681,729 | 8/1928 | Gold et al. | 277/181 |
| 2,462,762 | 2/1949 | Nardin | 277/11 |
| 2,867,464 | 1/1959 | Crampton | 277/181 |
| 3,262,722 | 7/1966 | Gastineau | 277/11 |
| 3,278,883 | 10/1966 | Lipsey | 277/181 |
| 4,552,389 | 11/1985 | Babuder et al. | 277/189 |
| 4,813,687 | 3/1989 | Nakayama et al. | 277/235 B |

FOREIGN PATENT DOCUMENTS

| | | |
|---|---|---|
| 228326 | 9/1985 | Fed. Rep. of Germany . |
| 2594186 | 8/1987 | France . |
| 2163807 | 3/1986 | United Kingdom . |

Primary Examiner—William A. Cuchlinski, Jr.
Assistant Examiner—Daniel G. DePumpo
Attorney, Agent, or Firm—Kanesaka and Takeuchi

[57] ABSTRACT

A clip of the invention is designed to attach a gasket to a gasket attaching portion of an engine part. The clip comprises a body, a projection formed at a first end portion of the body, and an engaging portion formed at a second end portion of the body. The projection extends substantially perpendicularly to the body, and the engaging portion extends in the same direction as in the projection. When the gasket is attached to the gasket attaching portion, the projection engages the gasket and the engaging portion engages the gasket attaching portion of the engine part. The gasket can be easily installed between the two engine parts.

11 Claims, 2 Drawing Sheets

CLIP FOR A GASKET

CROSS REFERENCE TO RELATED APPLICATION

This is a continuation in part application of patent application Ser. No. 775,529 filed on Oct. 15, 1991.

BACKGROUND OF THE INVENTION AND RELATED ART STATEMENT

The present invention relates to a clip for a gasket to be used when installing the gasket between engine parts, more particularly, the clip holding the gasket to one of the engine parts to easily locate the gasket between the engine parts.

A gasket is installed between two engine parts, such as between a cylinder head and a cylinder block, between a cylinder head and a manifold and so on, for sealing therebetween.

In case a gasket is installed between the cylinder head and the cylinder block, positioning pins are generally formed on the cylinder block, while the gasket is provided with positioning holes. The gasket can be properly positioned on the cylinder block by engaging the positioning holes of the gasket with the positioning pins on the cylinder block.

However, in case a manifold gasket is installed between the cylinder head and the manifold, there are no special positioning pins. Also, a gasket attaching surface of the cylinder head may not orient upwardly. Sometimes, the gasket attaching surface is oriented sidewardly or downwardly. In these cases, the manifold gasket can not be simply located on the cylinder head, or on the manifold. Therefore, when the manifold gasket is installed, the manifold gasket must be held by a person installing the manifold.

In case a space or angle for installing the manifold is limited, it is very difficult to hold the manifold gasket on the cylinder head or the manifold and to fasten the manifold to the cylinder head. In some cases, one person can not install the manifold to the cylinder head by oneself.

As explained above, the cylinder block is provided with the positioning pins for aligning the gasket and the cylinder head. However, there is no means for attaching the gasket on one of the engine parts so that the gasket can be easily fixed to the engine part in case the gasket attaching portion orients sidewardly or downwardly or the gasket is moved together with the engine part for attachment.

Accordingly, one object of the invention is to provide a clip for a gasket, wherein the gasket can be attached to an appropriate portion on an engine part when installing the gasket between the engine parts.

Another object of the invention is to provide a clip as stated above, wherein the gasket can be securely attached to the engine part even if the engine part is moved.

A further object of the invention is to provide a clip as stated above, wherein the clip can be easily and economically manufactured.

A still further object of the invention is to provide a combination of a clip and a gasket for easily attaching the gasket to an appropriate portion on the engine part by means of the clip.

Further objects and advantages of the invention will apparent from the following description of the invention.

SUMMARY OF THE INVENTION

In accordance with the present invention, a clip is used for attaching a gasket to a gasket attaching portion of an engine part. The engine part to which the gasket is attached by the clip is easily fixed to another engine part without supporting the gasket between the engine parts.

The clip comprises a body, a projection formed at a first end portion of the body, and an engaging portion formed at a second end portion of the body. The first end portion is located away from the second end portion.

The projection extends substantially perpendicularly to the body. Also, the engaging portion extends in the same direction as in the projection. When the gasket is attached to the gasket attaching portion, the projection engages the gasket and the engaging portion engages the gasket attaching portion of the engine part. Therefore, the gasket is attached to the gasket attaching portion of the engine part by the clip.

The engaging portion is preferably curved or turned to provide resiliency thereat. Alternatively, the body may be curved to provide resiliency. As a result, the gasket can be resiliently attached to the gasket attaching portion by the clip.

The clip may be provided with an operation portion extending outwardly from the engaging portion parallel to the body. The clip can be attached to or detached from the gasket attaching portion by operating the operation portion.

The clip may be formed of a flexible plate with resiliency, or a resilient wire. In case the clip is formed of the wire, two sets of the body, the projection and the engaging portion are arranged side by side, which are connected together at a predetermined distance away from each other.

The clip of the invention can attach any type of a gasket to the gasket attaching portion of the engine part. When the gasket is properly held between the two engine parts, the clip may be left between the gasket and one of the engine parts. The clip may be removed from the gasket.

In case the gasket is formed of a resilient material, even if the projection of the clip is left on the gasket when the gasket is tightened between the engine parts, the gasket can be compressed at the projection of the clip without affecting to the sealing ability of the gasket. However, in case the gasket is formed of metal, it is preferable to form a notch or recess on or in the gasket, to which the projection of the clip is located, so that the gasket can be properly retained between the engine parts.

DETAILED DESCRIPTION OF PREFERRED EMBODIMENTS

Figure 1:
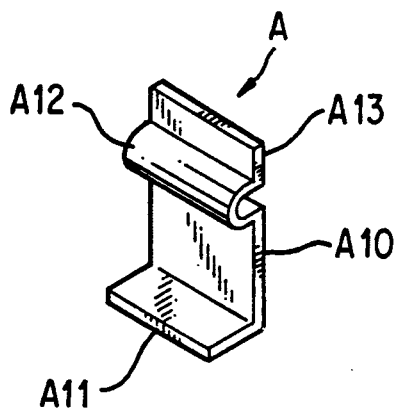
FIG. 1 is a perspective view of a first embodiment of a clip of the invention.

Referring to FIG. 1, a first embodiment A of a clip for a gasket formed in accordance with the present invention is shown. The clip A comprises a body portion A10, a projection A11, an engaging portion A12 and an operation portion A13. The projection A11 extends substantially perpendicularly from one end of the body portion A10. Also, the engaging portion A12 extends substantially perpendicularly from the body portion A10. The engaging portion A12 extending from the body portion A10 is turned rearwardly, from which the operation portion A13 extends upwardly.

The clip A is formed of a metal plate, such as a soft steel plate and a spring material, to have resiliency. The thickness of the metal plate for the clip A is between 0.1 and 0.4 mm.

Since the clip A is made of the steel plate, the clip, especially the projection A11 and the engaging portion A12, has resiliency. Therefore, the clip can firmly attach a gasket to a gasket attaching portion of an engine part.

Figure 2:
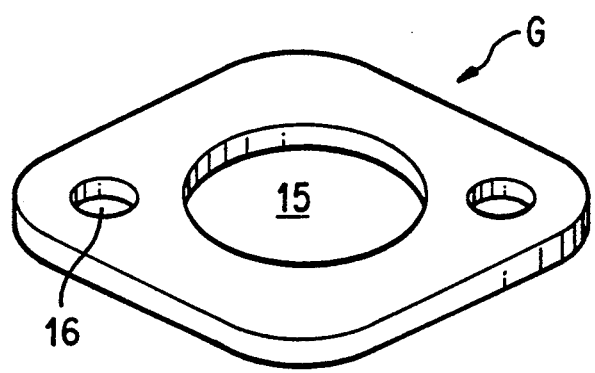
FIG. 2 is a perspective view for showing one example of a manifold gasket to be fixed by the clip of the invention.

FIG. 2 shows an example of a gasket G to be held between a manifold M (FIG. 3) and a cylinder head (not shown). The gasket G has a shape similar to a flange F of the manifold M to be attached, and includes a central hole 15 and two bolt holes 16. The gasket G is made of inorganic fibers bonded together by a binder.

Figure 3:
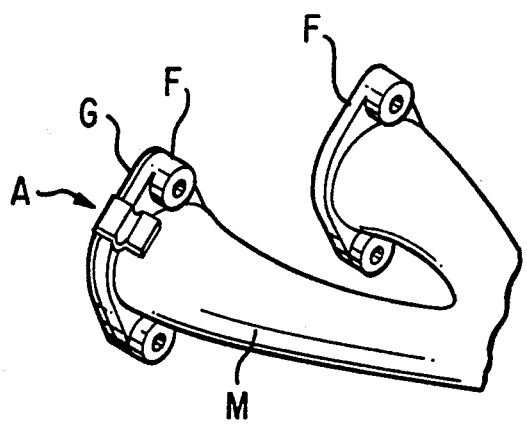
FIG. 3 is an explanatory perspective view for showing that the gasket of FIG. 2 is attached to a manifold by the clip of the invention.

The clip A of the invention is used when the gasket G can not be stably placed on a gasket attaching portion of the cylinder head, such as the gasket attaching portion oriented sidewardly or downwardly. In this case, when the gasket G is installed between the manifold M and the cylinder head, the gasket G is at first attached to the flange F by the clips A (one clip is shown in FIG. 3).

When the gasket is attached to the manifold A, the projection A11 is located under the gasket G and the engaging portion A12 is located above the flange F by pushing the operation portion A13. It is preferable to use at least two clips to attach the gasket G to the flange F.

After the gasket G is attached to the manifold M by the clips A, even if the manifold M is oriented downwardly, the gasket G is not detached from the manifold M. Therefore, the manifold can be moved freely to engage with the cylinder head. After the manifold M with the gasket G and the cylinder head are aligned, the manifold M and the cylinder head are connected together by bolts (not shown). Since the gasket G is compressible, when the bolts are tightened, the projection A11 is pushed to enter into the gasket G. The projection A11 does not affect the sealing ability of the gasket G.

In the above embodiment, the clip A is not removed from the gasket. However, if desired, the clip A may be removed from the gasket before the bolts are firmly tightened.

Figure 4:
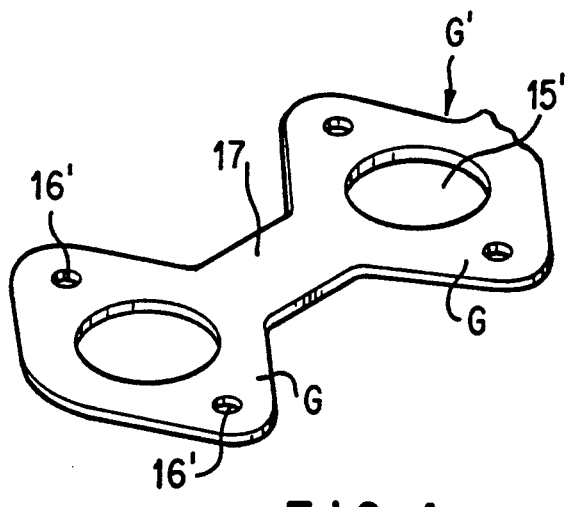
FIG. 4 is a perspective view for showing another example of a manifold gasket to be fixed by the clip of the invention.
Figure 5:
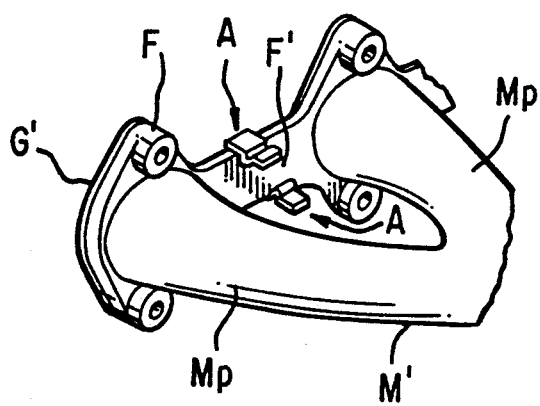
FIG. 5 is an explanatory perspective view for showing that the gasket of FIG. 4 is attached to the manifold by the clip of the invention.

As shown in FIGS. 4 and 5, in case a manifold M' has flange connecting portions F' between manifold pipes Mp, the gaskets G for the manifold M' are connected together at connecting portions 17 to form a gasket assembly G'. When the gasket assembly G' is attached to the manifold M', the clips A are placed at the connecting portions F' and 17. As a result, the gasket assembly G' can be securely attached to the manifold M, without affecting the sealing ability of the gasket and considering the thickness of the gasket G.

Figure 6:
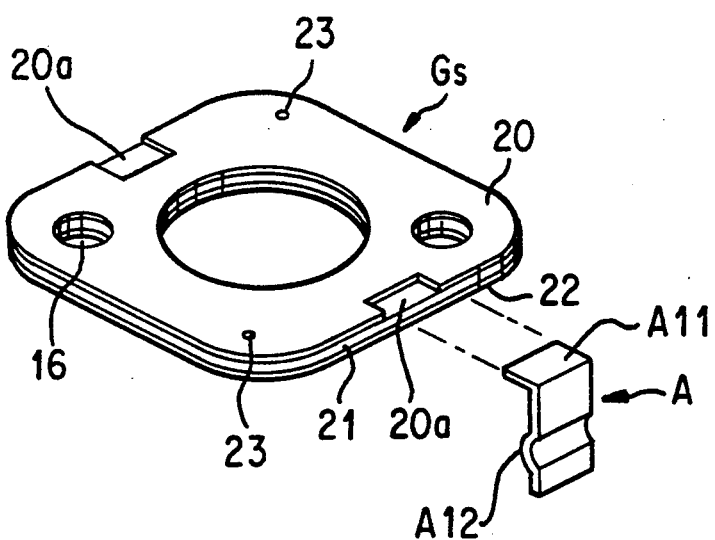
FIG. 6 is a perspective view of a metal gasket having recesses for receiving the clip of the invention.

FIG. 6 shows a steel laminate gasket Gs to be installed between the manifold and the cylinder block by the clips A. The gasket Gs includes a central hole 15' and two bolt holes 16' as in the gasket G, and is formed of an upper plate 20 with two notches 20a, a middle plate 21 and a lower plate 22, which are connected together by spot welding 23.

When the gasket Gs is attached to the manifold M, the gasket Gs is arranged such that the upper plate 20 faces outwardly relative to the manifold M. Then, the projection A11 of each clip A is placed in the notch 20a, and the engaging portion A12 is engaged with the flange of the manifold M.

In the gasket Gs, the notches 20a are formed in the upper plate 20. However, recesses may be formed in the middle plate 21, into which the projection A11 may be inserted. Accordingly, the gasket with the recesses may be attached to the manifold by the clips.

Figure 7:
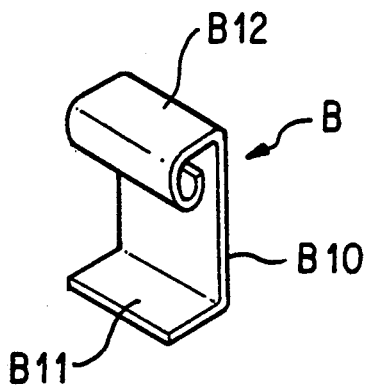
FIGS. 7 to 10 are perspective views of the second to fifth embodiments of the clip of the invention.

FIG. 7 shows a second embodiment B of the clip of the invention. The clip B is formed of a metal plate, and includes a body B10, a projection B11 and an engaging portion B12. In the clip B, since the engaging portion B12 is curved downwardly at a forward end, the engaging portion B12 has resiliency to hold the gasket between the projection B11 and the engaging portion B12. The gasket B operates as in the gasket A.

Figure 8:
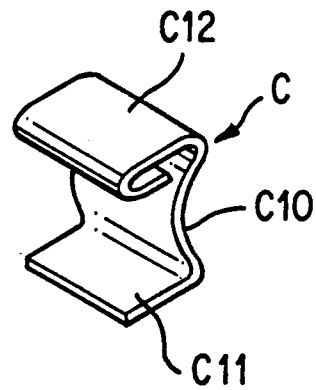

FIG. 8 shows a third embodiment C of the clip of the invention. The clip C is formed of a metal plate, and includes a body C10, a projection C11 and an engaging portion C12, similar to the clip B. In the clip C, however, the body C10 is also curved to provide resiliency thereat. The clip C can attach the gasket to the engine part, as in the gasket B.

Figure 9:
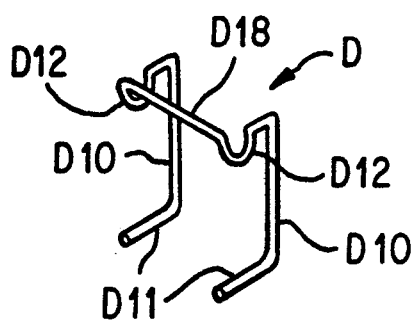

FIG. 9 shows a fourth embodiment D of the clip of the invention. The clip D is formed of a resilient wire and includes two sets, each having a body D10, a projection D11 and an engaging portion D12. A connecting portion D18 connects the engaging portions D12 of the respective sets together. The clip D operates as in the clip B.

Figure 10:
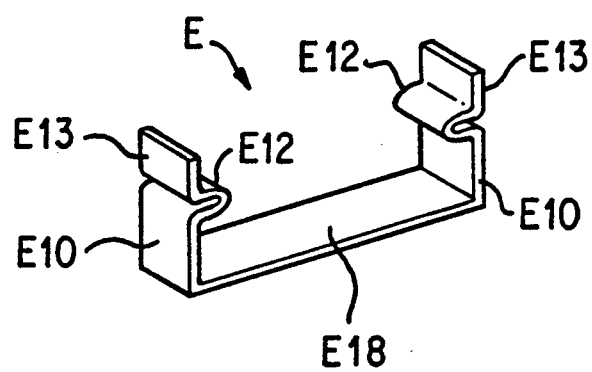

FIG. 10 shows a fifth embodiment E of the clip of the present invention. The clip E is formed of a resilient metal plate and includes two sets, each having a body E10, an engaging portion E12 and an operation portion E13. A connecting portion E18 connects the body portions E10 together such that the engaging portions E12 face against each other.

The clip E is especially useful when attaching the gasket G' with the connecting portions 17 as shown in FIG. 4 to the flange connecting portions F' of the manifold M' (FIG. 5). In the clip E, therefore, the distance between the body portions E10 is selected to substantially have the same width as in the flange connecting portion F' as shown in FIG. 5.

When installing the gasket on the manifold M', the clip E is pushed over the connecting portion 17. Accordingly, the connecting portion E18 holds the connecting portion 17 of the gasket and the engaging portions E12 engage the flange connecting portions F' of the manifold M'. The gasket can be easily installed on the manifold by the clip E.

In the present invention, the clip can firmly attach the claims. gasket to one of the engine parts. Therefore, when the gasket is situated between the two engine parts, the gasket need not be supported by a user. Even if a gasket attaching portion is located in a troublesome place, the gasket can be easily installed between the engine parts.

While the invention has been explained with reference to the specific embodiments of the invention, the explanation is illustrative and the invention is limited only by the appended claims.

What is claimed is:

1. A clip adapted to attach a gasket with an edge portion to a gasket attaching portion of an engine part, comprising:
    an elongated body having a first end portion and a second end portion located away from the first end portion, said body having a width and a resiliency,
    a projection integrally formed with the body at the first end portion of the body, said projection extending substantially perpendicularly to the body and having a width substantially the same as in the elongated body, and
    an engaging portion integrally formed with the body at the second end portion and having a width substantially the same as in the elongated body, said engaging portion extending in the same direction as in the projection so that when the gasket is attached to the gasket attaching portion, the projection engages a part of the edge of the gasket and the engaging portion engages the gasket attaching portion to thereby hold the gasket to the gasket attaching portion.

2. A clip according to claim 1, wherein said engaging portion is curved to provide resiliency thereat.

3. A clip according to claim 2, further comprising an operation portion extending from the engaging portion parallel to the body, said operation portion being operated to attach the clip to the gasket attaching portion and to detach the clip from the gasket attaching portion.

4. A clip according to claim 2, wherein said body is curved to provide resiliency thereat.

5. A clip according to claim 2, wherein said clip is made of a flexible plate with resiliency.

6. A clip according to claim 1, wherein said clip is formed of two sets, each set having the body, the projection and the engaging portion, said projections of the two sets being connected together with a connecting portion and being spaced predetermined distance away from each other such that the engaging portions face against each other.

7. A clip according to claim 6, wherein said engine part includes a flange connecting portion, said distance of the projections between the bodies being substantially the same as a width of the flange connecting portion.

8. A clip according to claim 1, wherein said clip is made of a resilient wire, two sets, each set having the body, the projection and the engaging portion, said projections being connected together with a connecting portion and being spaced a predetermined distance away from each other.

9. A combination of a gasket and a clip adapted to attach the gasket to a gasket attaching portion of an engine part, comprising:
    said clip including an elongated body having a first end portion and a second end portion located away from the first end portion, said body having a width and a resiliency; a projection integrally formed with the body at the first end portion of the body, said projection having a width substantially the same as in the elongated body and extending substantially perpendicularly to the body; and an engaging portion integrally formed with the body at the second end portion and having a width substantially the same as in the elongated body, said engaging portion extending in the same direction as in the projection so that when the gasket is attached to the gasket attaching portion, the projection engages the gasket and the engaging portion engages the gasket attaching portion, and
    said gasket having an edge portion and at least one recess formed at the edge portion, said recess having a width larger than that of the projection so that when said projection of the clip is located in the recess for holding the gasket to the gasket attaching portion, the gasket is compressed between engine parts without being affected by the projection of the clip.

10. A combination according to claim 9, wherein said gasket is formed of at least three metal plates, said recess being formed in a middle plate.

11. A clip adapted to attach a gasket with an edge portion to a gasket attaching portion of an engine part, comprising:
    an elongated body having a first end portion and a second end portion located away from the first end portion, said body having a width and being made of a flexible plate with a resiliency,
    a projection integrally formed with the body at the first end portion thereof and extending substantially perpendicularly to the body, said projection having a width substantially the same as in the elongated body and a length less than a length of the elongated body,
    an engaging portion integrally formed with the body at the second end portion thereof and having a width substantially the same as in the elongated body, said engaging portion being curved to provide resiliency thereat and extending in the same direction as the projection, and
    an operation portion extending from the engaging portion to be parallel to the body in a direction away from the body, said operation portion being operated to attach the clip to the gasket attaching portion so that when the gasket is attached to the gasket attaching portion, the projection engages a part of the edge of the gasket and the engaging portion engages the gasket attaching portion to thereby securely hold the gasket to the gasket attaching portion.

* * * * *